US006780486B2

(12) United States Patent
Kuo et al.

(10) Patent No.: US 6,780,486 B2
(45) Date of Patent: Aug. 24, 2004

(54) SELF-ADHESIVE BULLETIN BOARD ASSEMBLY WITH A BULLETIN BOARD AND A TRANSPARENT SHEET

(75) Inventors: Tsung-Tien Kuo, Kaohsiung Hsien (TW); Jen-Rong Liu, Feng-Shan (TW); Hsieh-Chang Hsieh, Feng-Shan (TW)

(73) Assignee: Taiwan Hopax Chems Mfg. Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 10/190,576

(22) Filed: Jul. 9, 2002

(65) Prior Publication Data

US 2004/0009318 A1 Jan. 15, 2004

(51) Int. Cl.[7] .................................................. B32B 7/12

(52) U.S. Cl. .......................... 428/40.1; 40/584; 40/615; 40/624; 428/41.7; 428/41.8; 428/41.9; 428/42.1; 428/42.3; 428/354; D20/10; D20/12; D20/22

(58) Field of Search ............................... 428/40.1, 41.7, 428/41.8, 41.9, 42.1, 42.3, 354; 40/584, 624, 615; D20/10, 12, 22

(56) References Cited

U.S. PATENT DOCUMENTS

| | | | | |
|---|---|---|---|---|
| 4,911,477 A | * | 3/1990 | Shishido | 283/100 |
| 5,342,665 A | | 8/1994 | Krawitz | 428/40 |
| 6,589,624 B1 | * | 7/2003 | Lee | 428/40.1 |

FOREIGN PATENT DOCUMENTS

| | | |
|---|---|---|
| JP | 2001/142381 | 5/2001 |

* cited by examiner

*Primary Examiner*—Nasser Ahmad
(74) *Attorney, Agent, or Firm*—Harness, Dickey & Pierce, P.L.C.

(57) ABSTRACT

A self-adhesive bulletin board assembly includes a bulletin board with a surface coated with a first adhesive layer that is adapted to be attached to a support surface, and a transparent sheet with opposite first and second surfaces that are coated with second and third adhesive layers, respectively. The transparent sheet is sandwiched between first and second protecting sheets prior to attachment of the same to the bulletin board, and is capable of visually exposing the bulletin board when removed from the first and second protecting sheets and attached to the bulletin board by one of the second and third adhesive layers.

2 Claims, 2 Drawing Sheets

SELF-ADHESIVE BULLETIN BOARD ASSEMBLY WITH A BULLETIN BOARD AND A TRANSPARENT SHEET

BACKGROUND OF THE INVENTION

1. Field of the Invention

This invention relates to a self-adhesive bulletin board assembly including a bulletin board and a transparent sheet with two opposite surfaces coated with an adhesive material.

2. Description of the Related Art

U.S. Pat. No. 5,342,665 discloses a conventional self-adhesive bulletin board assembly which employs adhesive strip elements on a front side of a bulletin board for repeatedly attaching and removing items, such as notes, schedules, coupons, pens, keys, and the like, without using pins or tacks. Each strip element includes a tacky adhesive portion for attachment of the items. A non-tacky indentation is defined between two adjacent strip elements, and facilitates removal of the item attached to the two adjacent strip elements.

Japanese Laid-Open No. 2001-142381 discloses another conventional self-adhesive bulletin board normally includes a sheet-type substrate with two opposite surfaces, each of which is coated with an adhesive layer. The surfaces of the bulletin board are covered with protecting sheets so as to protect the adhesive layers prior to use. In use, the substrate is removed from the protecting sheets, and is adhesively attached to a support surface, such as a wall, by the adhesive layer on one of the opposite surfaces of the substrate, thereby permitting attachment of items, such as notes and posters, to the adhesive layer on the other one of the opposite surfaces of the substrate without using pins or tacks.

In order to be attractive, the conventional self-adhesive bulletin boards may be printed with patterns thereon. However, the patterns on the conventional self-adhesive bulletin boards are in pre-printed patterns, which normally could not best fit to individual user's interests. It is possible to have personalized printed patterns printed on the other one of the surfaces of the substrate to enhance the attractive appearance of the bulletin board. However, it would be laborious and costly to manufacture the personalized bulletin board as such, since the manufacturing process would require preparation of printing plates for printing patterns, such as scenery and pictures of famous people, onto the other one of the surfaces prior to the coating of the adhesive layer thereon. Because of the inconvenience, the low flexibility, and the high cost of the process, the conventional self-adhesive bulletin board is unsuitable and infeasible for a personalized product.

SUMMARY OF THE INVENTION

Therefore, it is an object of the present invention to provide a self-adhesive bulletin board assembly that is capable of overcoming the aforesaid drawbacks.

According to the present invention, there is provided a self-adhesive bulletin board assembly that comprises: a bulletin board with opposite first and second surfaces, the second surface being coated with a first adhesive layer that is adapted to be attached to a support surface, the first surface being printable; a first protecting sheet with opposite first and second surfaces that are coated with a release agent, the first surface of the first protecting sheet being releasably attached to the first adhesive layer so as to protect the first adhesive layer prior to use; a transparent sheet with opposite first and second surfaces that are coated with second and third adhesive layers, respectively, the second adhesive layer being adhesively attached to the second surface of the first protecting sheet; and a second protecting sheet with a surface coated with a release agent. The surface of the second protecting sheet is releasably attached to the third adhesive layer so as to protect the third adhesive layer prior to use. The transparent sheet is capable of visually exposing the first surface of the bulletin board when removed from the first and second protecting sheets and attached to the first surface of the bulletin board by one of the second and third adhesive layers.

BRIEF DESCRIPTION OF THE DRAWINGS

In drawings which illustrate a preferred embodiment of the invention.

DETAILED DESCRIPTION OF THE PREFERRED EMBODIMENT

Figure 1:
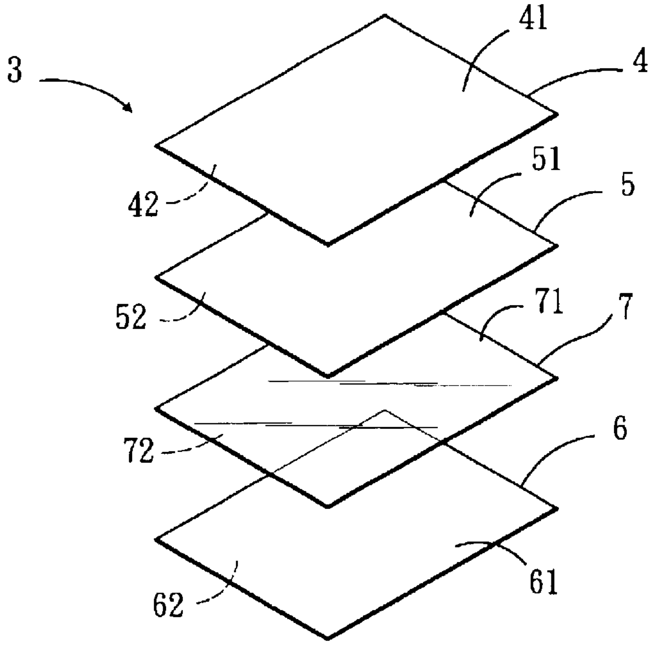
FIG. 1 is a schematic exploded view of a self-adhesive bulletin board assembly embodying this invention.
Figure 2:
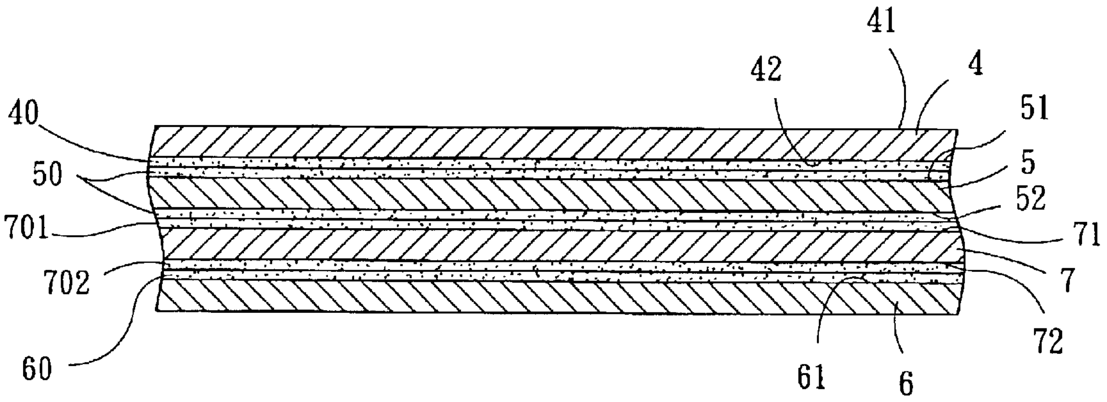
FIG. 2 is a schematic sectional view of the self-adhesive bulletin board assembly of FIG. 1.

FIGS. 1 and 2 illustrate a preferred embodiment of a self-adhesive bulletin board 3 of this invention. The self-adhesive bulletin board 3 includes: a bulletin board 4 with opposite first and second surfaces 41, 42, the second surface 42 being coated with a first adhesive layer 40 that is adapted to be attached to a support surface 100 (see FIG. 3), such as a wall of a building, the first surface 41 being printable; a first protecting sheet 5 with opposite first and second surfaces 51, 52 that are coated with a release agent 50, the first surface 51 of the first protecting sheet 5 being releasably attached to the first adhesive layer 40 so as to protect the first adhesive layer 40 prior to use; a transparent sheet 7 with opposite first and second surfaces 71, 72 that are coated with second and third adhesive layers 701, 702, respectively, the second adhesive layer 701 being adhesively attached to the second surface 52 of the first protecting sheet 5; and a second protecting sheet 6 with a surface 61 coated with a release agent 60. The surface 61 of the second protecting sheet 6 is releasably attached to the third adhesive layer 702 so as to protect the third adhesive layer 702 prior to use.

The bulletin board 4 is preferably made from a paper board or a plastic board that is made from a plastic material, such as polyethylene and polyvinyl chloride, and that is surface treated in order to be printable.

Figure 3:
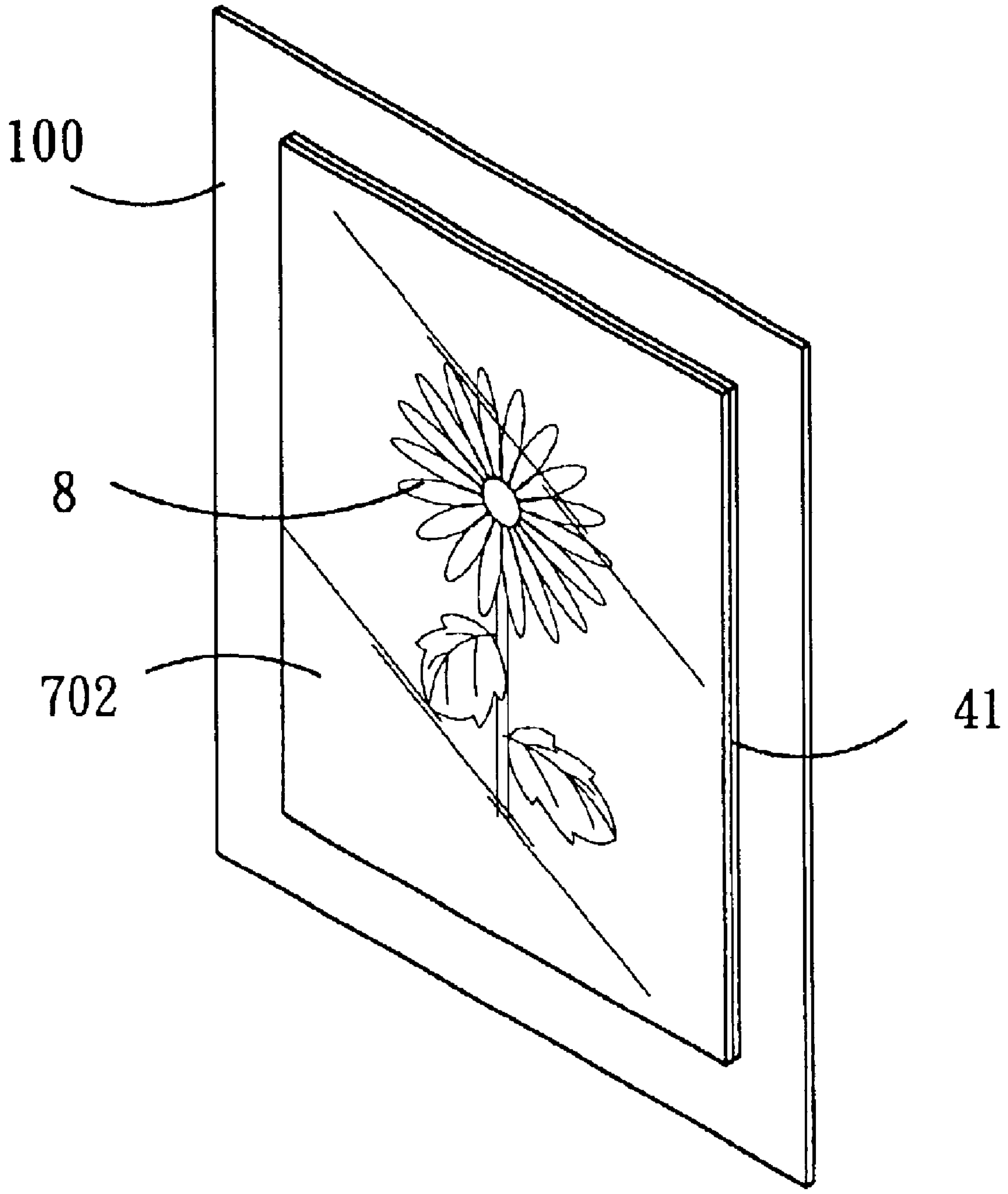
FIG. 3 is a schematic view to illustrate how the self-adhesive bulletin board assembly of FIG. 1 can be used.

Referring now to FIG. 3, in combination with FIGS. 1 and 2, the self-adhesive bulletin board assembly 3 of this invention provides a do-it-yourself function that permits the user to print (for example, by computer printers) his or her favorite patterns 8 on the first surface 41 of the bulletin board 4 on his or her own prior to the removal of the transparent sheet 7 and the first and second protecting sheets 5, 6 from the self-adhesive bulletin board assembly 3 and attachment of the transparent sheet 7 onto the first surface 41 of the bulletin board 4 via the second adhesive layer 701. The transparent sheet 7 is preferably made from a transparent plastic sheet that is capable of visually exposing the patterns 8 on the first surface 41 of the bulletin board 4, and permits attachment of items, such as notes and posters (not shown), onto the transparent sheet 7 via the third adhesive layer 702 when attached to the first surface 41 of the bulletin board 4 via the second adhesive layer 701.

The second and third adhesive layers 701, 702 are preferably made from pressure sensitive adhesive, and the third adhesive layer 701 is more preferably made from a removable pressure sensitive adhesive so as to permit removable of items attached thereto.

With the inclusion of the transparent sheet 7 in the self-adhesive bulletin board assembly 3 of this invention, the aforementioned drawbacks associated with the prior art can be eliminated.

With the invention thus explained, it is apparent that various modifications and variations can be made without departing from the spirit of the present invention. It is therefore intended that the invention be limited only as recited in the appended claims.

We claim:

1. A self-adhesive bulletin board assembly comprising:

a bulletin board with opposite first and second surfaces, said second surface being coated with a first adhesive layer that is adapted to be attached to a support surface, said first surface being printable;

a first protecting sheet with opposite first and second surfaces that are coated with a release agent, said first surface of said first protecting sheet being releasably attached to said first adhesive layer so as to protect said first adhesive layer prior to use;

a transparent sheet with opposite first and second surfaces that are coated with second and third adhesive layers, respectively, said second adhesive layer being adhesively attached to said second surface of said first protecting sheet; and a second protecting sheet with a surface coated with a release agent, said surface of said second protecting sheet being releasably attached to said third adhesive layer so as to protect said third adhesive layer prior to use;

wherein said transparent sheet is capable of visually exposing said first surface of said bulletin board when removed from said first and second protecting sheets and attached to said first surface of said bulletin board via one of said second and third adhesive layers.

2. The self-adhesive bulletin board of claim 1, wherein said third adhesive layer is made from a removable pressure sensitive adhesive.

* * * * *